United States Patent
Ma et al.

(10) Patent No.: US 10,530,134 B2
(45) Date of Patent: Jan. 7, 2020

(54) SWITCHGEAR

(71) Applicant: LSIS CO., LTD., Anyang-si, Gyeonggi-do (KR)

(72) Inventors: Ji Hoon Ma, Anyang-si (KR); Jong Doo Kim, Anyang-si (KR); Seung Hwan Mun, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/224,035

(22) Filed: Dec. 18, 2018

(65) Prior Publication Data
US 2019/0260190 A1 Aug. 22, 2019

(30) Foreign Application Priority Data

Feb. 20, 2018 (KR) ........................ 10-2018-0020032

(51) Int. Cl.
| | | |
|---|---|---|
| *H02B 13/025* | (2006.01) | |
| *H02B 1/30* | (2006.01) | |
| *H02B 11/04* | (2006.01) | |
| *H02B 1/20* | (2006.01) | |
| *H02B 1/32* | (2006.01) | |

(52) U.S. Cl.
CPC ............. *H02B 13/025* (2013.01); *H02B 1/20* (2013.01); *H02B 1/30* (2013.01); *H02B 1/32* (2013.01); *H02B 11/04* (2013.01)

(58) Field of Classification Search
CPC ........ H02B 13/025; H02B 1/30; H02B 1/565; H02B 11/04; H02B 1/306; H02B 1/20; H02B 1/21; H02B 1/32; H01H 50/002; H01H 9/56; H01H 47/002
See application file for complete search history.

(56) References Cited

U.S. PATENT DOCUMENTS

| | | | | |
|---|---|---|---|---|
| 8,451,589 B2* | 5/2013 | Milovac | ................ | H02B 11/26 361/611 |
| 8,482,903 B2* | 7/2013 | Milovac | ................ | H02B 11/00 361/605 |
| 2010/0258532 A1* | 10/2010 | Miller | ................. | H02B 13/025 218/157 |
| 2011/0299226 A1* | 12/2011 | Milovac | ................ | H02B 11/00 361/605 |
| 2012/0013227 A1* | 1/2012 | Josten | ................. | H02B 13/025 312/109 |
| 2013/0170104 A1* | 7/2013 | Kim | ....................... | H02B 11/12 361/618 |

(Continued)

FOREIGN PATENT DOCUMENTS

CN 104064963 A 9/2014

*Primary Examiner* — Adam B Dravininkas
(74) *Attorney, Agent, or Firm* — K&L Gates LLP

(57) ABSTRACT

Provided is a switchgear. The switchgear includes a lower partition wall partitioning a cable compartment from a current transformer compartment disposed above the cable compartment and having an opening, a relief panel provided the lower partition wall to open and close opening, an upper partition wall partitioning the current transformer compartment from a main busbar compartment disposed above the current transformer compartment and having at least one through-hole, and an arc duct communicating with the main busbar compartment.

12 Claims, 10 Drawing Sheets

(56) References Cited

U.S. PATENT DOCUMENTS

| | | | |
|---|---|---|---|
| 2013/0240485 A1* | 9/2013 | Yabu | H02B 13/0354 218/139 |
| 2013/0327623 A1* | 12/2013 | Kozuru | H02B 13/025 200/5 B |
| 2016/0043532 A1* | 2/2016 | Zende | H02B 13/025 361/611 |
| 2016/0197459 A1* | 7/2016 | Motta | H02B 1/26 361/611 |
| 2017/0194772 A1* | 7/2017 | Mun | H02B 1/066 |

\* cited by examiner

SWITCHGEAR

CROSS-REFERENCE TO RELATED APPLICATIONS

The present application claims priority under 35 U.S.C. 119 and 35 U.S.C. 365 to Korean Patent Application No. 10-2018-0020032, filed on Feb. 20, 2018, which is hereby incorporated by reference in its entirety.

BACKGROUND

The present disclosure relates to a switchgear, and more particularly, to a switchgear from which an arc is discharged.

In general, a switchgear is electric equipment for safely supplying industrial power to the user. In the switchgear, devices such as a current transformer, a power transformer, a circuit breaker, and the like are safely accommodated in an iron enclosure.

FIG. 1 is a side view illustrating the inside of a switchgear according to the related art, and FIG. 2 is a perspective view of the switchgear according to the related art.

As illustrated in FIG. 1, a switchgear according to the related art, particularly, a metal-clad switchgear (MCSG) may be divided into a plurality of compartments. Also, a relay current transformer, a circuit breaker, a cable, a main busbar, and the like may be accommodated in the compartments, respectively. For example, the switchgear may include a current transformer compartment 2 in which a relay current transformer 2A is accommodated, a circuit breaker compartment 8 in which a circuit breaker (not shown) is accommodated, a relay compartment 9 in which a relay for controlling the switchgear is disposed, a cable compartment 1 in which a cable (not shown) is accommodated, and a main busbar compartment 3 in which a main busbar is accommodated.

Particularly, the current transformer compartment 2 may be partitioned from the cable compartment 1 by a lower partition wall 5 and be partitioned from the main busbar compartment 3 by an upper partition wall 6.

An arc may be generated in the switchgear due to a short-circuit accident, and the arc may be quickly discharged to the outside of the switchgear through an arc duct 7. For example, an arc generated in the circuit breaker compartment 8 or the relay compartment 9 may be discharged through a front arc duct 7A, and an arc generated in the main busbar compartment 3 may be discharged through at least one of the front arc duct 7A and a rear arc duct 7B.

Particularly, when an arc is generated in the cable compartment 1, the arc may not be introduced into the current transformer compartment 2 by the lower partition wall 5 but be discharged to the arc duct 7B through an arc passage 4 disposed at a rear side of the current transformer compartment 2.

However, the arc passage 4 may be a narrow space between the current transformer compartment 2 and a rear plate of the switchgear. Thus, the arc generated in the cable compartment 1 may not be smoothly discharged. In this case, a relatively weak portion within the switchgear may not withstand the internal pressure due to the arc and thus be broken down. As a result, when the arc leaks, there is a risk of leading to a serious accident. In addition, if the arc passage 4 is widened unintentionally, the switchgear may increase in size.

SUMMARY

Embodiments provide a switchgear from which an arc is smoothly discharged while maintaining a size of the switchgear.

In one embodiment, a switchgear includes: a lower partition wall partitioning a cable compartment from a current transformer compartment disposed above the cable compartment and having an opening; a relief panel provided on the lower partition wall to open and close the opening; an upper partition wall partitioning the current transformer compartment from a main busbar compartment disposed above the current transformer compartment and having at least one through-hole; and an arc duct communicating with the main busbar compartment.

The switchgear may further include an arc passage bypassing the current transformer compartment to allow the cable compartment to communicate with the arc duct.

The arc duct may include: a front arc duct disposed at a front side of the main busbar compartment; and a rear arc duct disposed at a rear side of the main busbar compartment to communicate with the arc passage.

The arc passage may be disposed at a rear side of the current transformer compartment.

The through-hole may be defined closer to a rear edge of the upper partition wall than a front edge of the upper partition wall.

The relief panel may be disposed closer to a rear edge of the lower partition wall than a front edge of the lower partition wall.

The through-hole and the relief panel may at least partially overlap each other in a vertical direction.

The relief panel may be connected to a connection member provided on a top surface of the lower partition wall to rotate upward from the lower partition wall.

A hook protrusion restricting a rotation radius of the relief panel may be disposed on the lower partition wall.

The relief panel may have a size equal to or greater than that of the opening.

The connection member may be connected to a front or rear edge of the relief panel, and the relief panel may have a left and right length greater than a forward and backward length of the relief panel.

The switchgear may further include at least one elastic member connecting the lower partition wall to the relief panel.

A hollow part protruding upward from an edge of the opening may be defined in the lower partition wall, the relief panel may be disposed above the hollow part, and an elastic member connection part to which the elastic member is connected may be disposed on each of the lower partition wall and the relief panel.

The details of one or more embodiments are set forth in the accompanying drawings and the description below. Other features will be apparent from the description and drawings, and from the claims.

DETAILED DESCRIPTION OF THE EMBODIMENTS

Hereinafter, preferred embodiments of the present invention will be described with reference to the accompanying drawings, which are intended to illustrate the present invention in a manner that allows a person skilled in the art to easily carry out the invention and does not mean that the technical idea and scope of the invention are limited.

Figure 1:
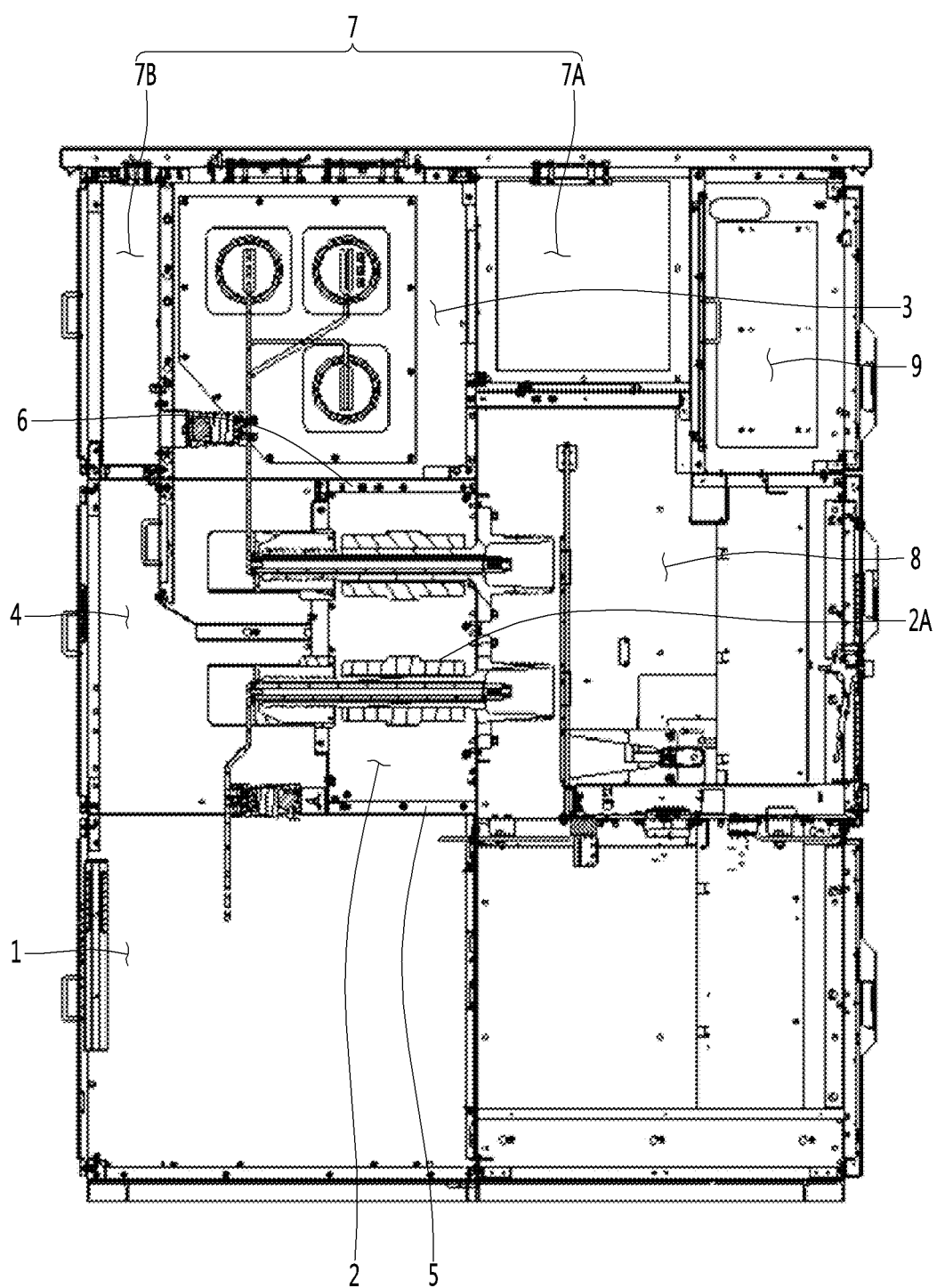
FIG. 1 is a side view illustrating the inside of a switchgear according to a related art.
Figure 2:
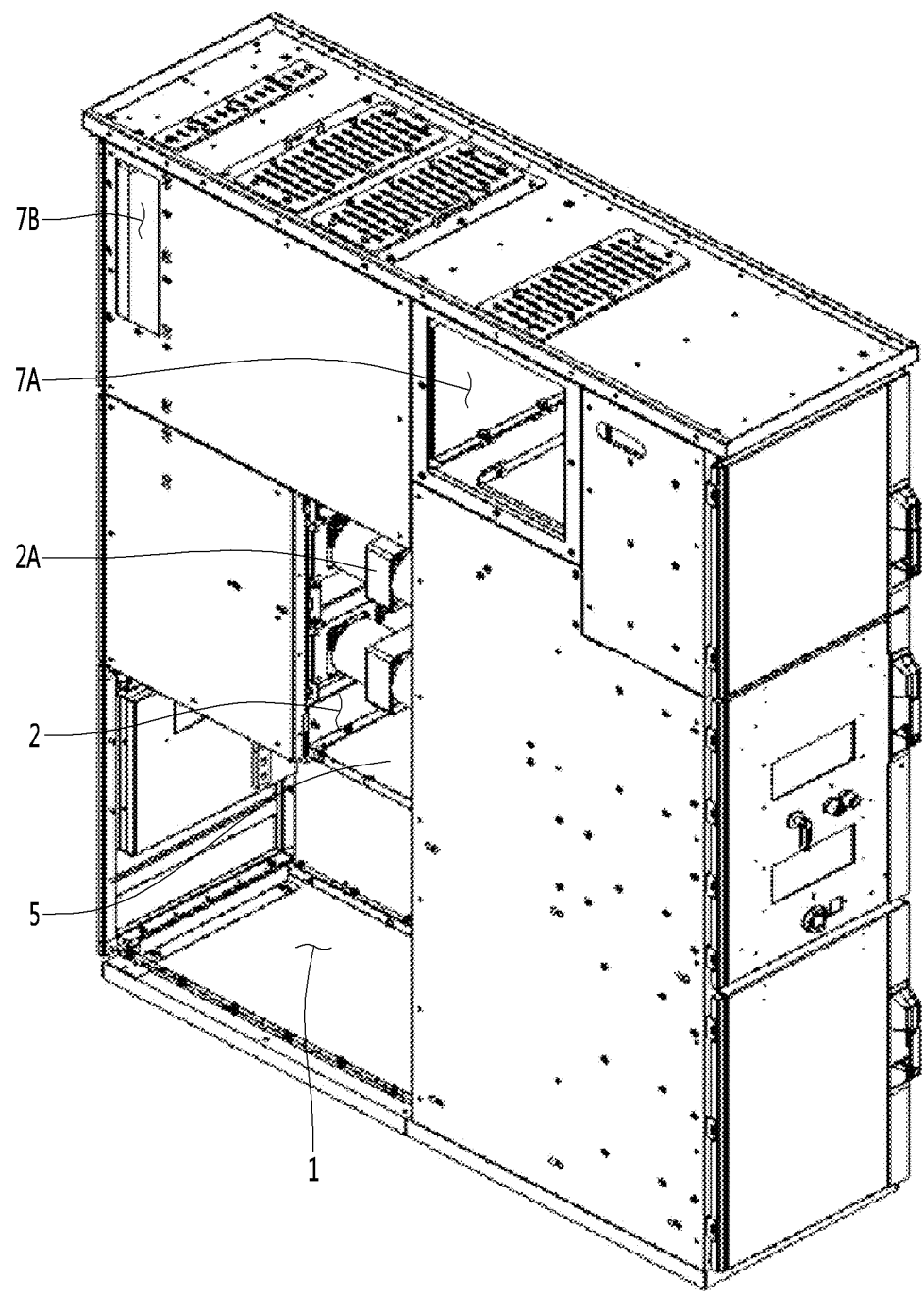
FIG. 2 is a perspective view of the switchgear according to the related art.
Figure 3:
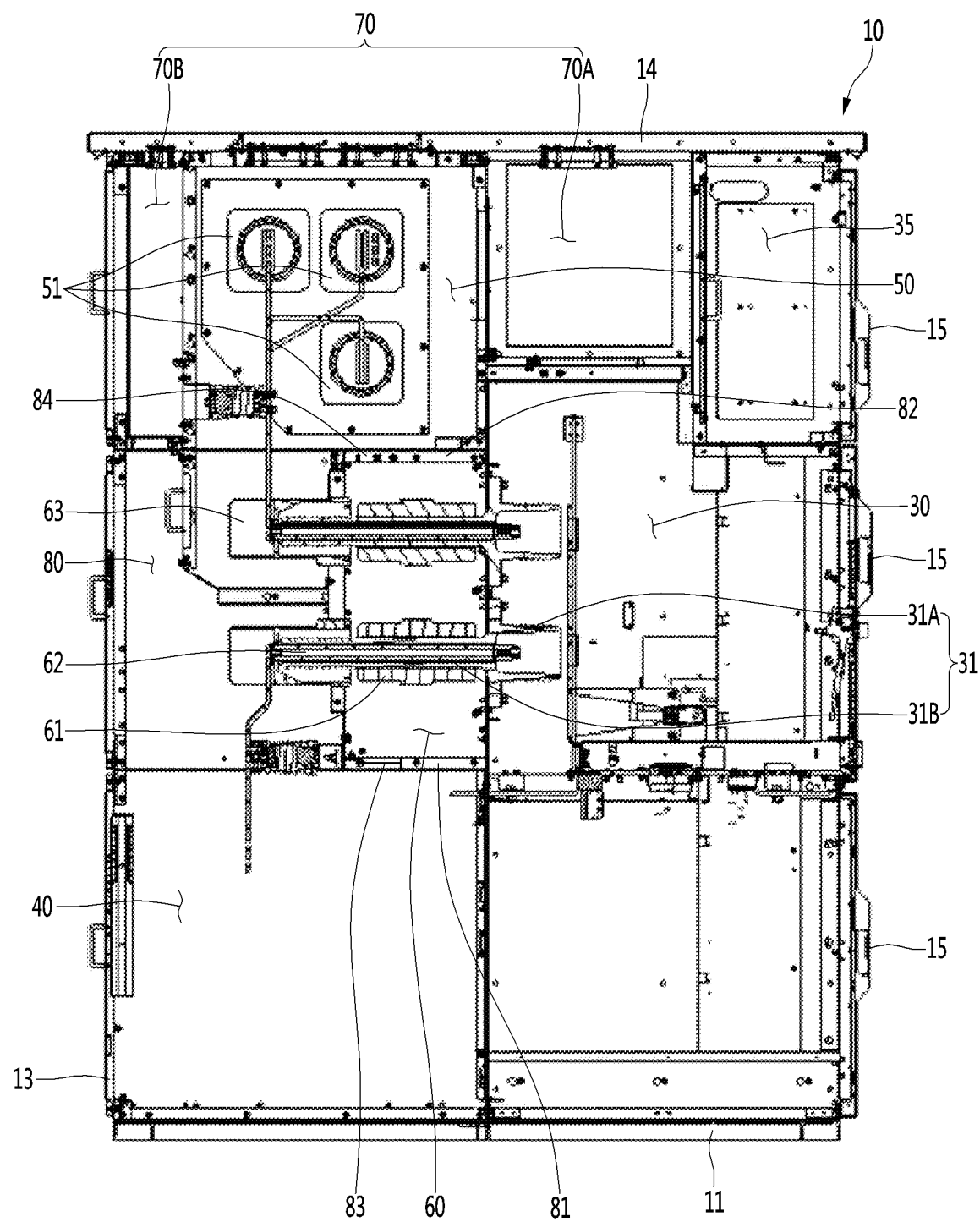
FIG. 3 is a side view illustrating the inside of a switchgear according to an embodiment.
Figure 4:
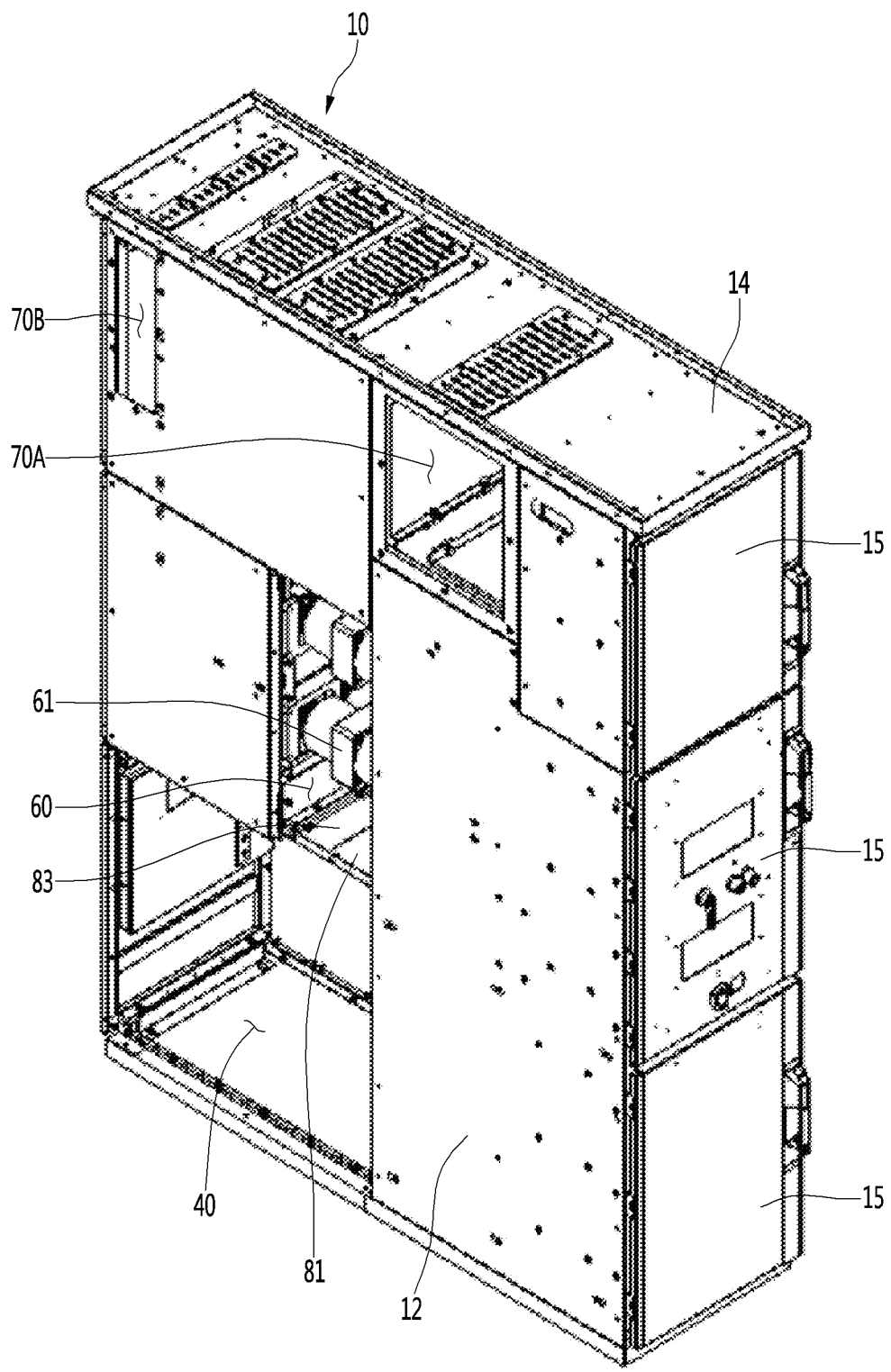
FIG. 4 is a perspective view of the switchgear according to an embodiment.
Figure 5:
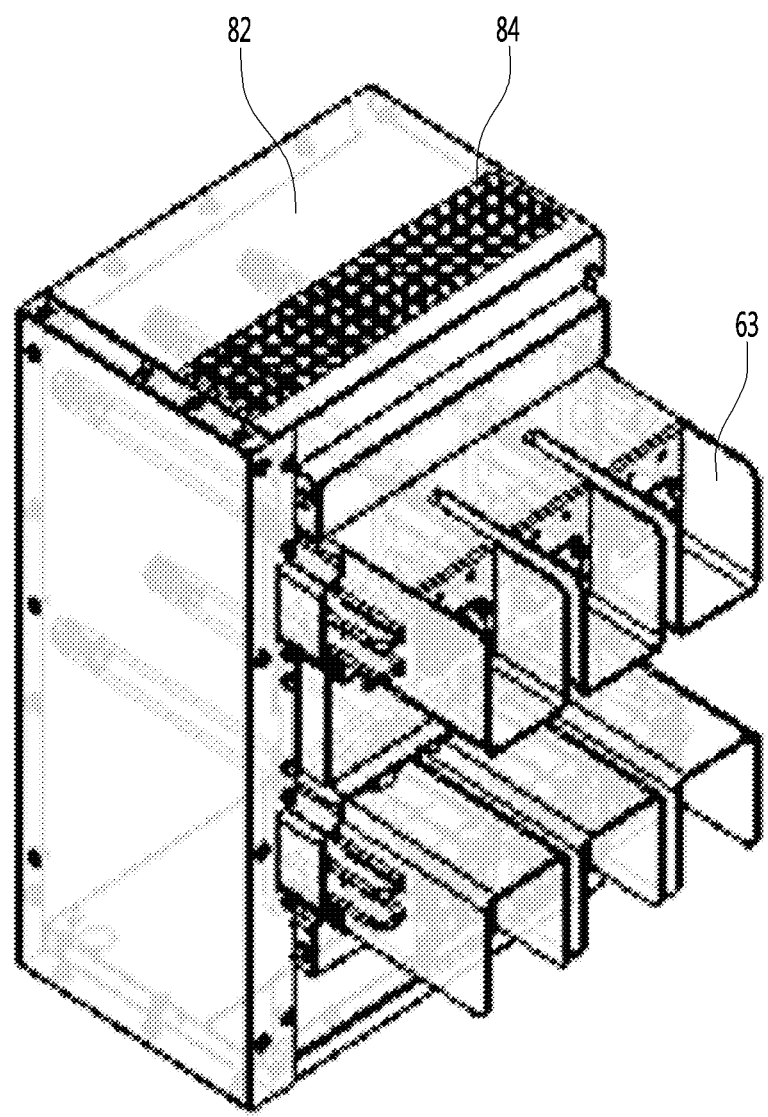
FIG. 5 is a rear perspective view of a current transformer compartment.
Figure 6:
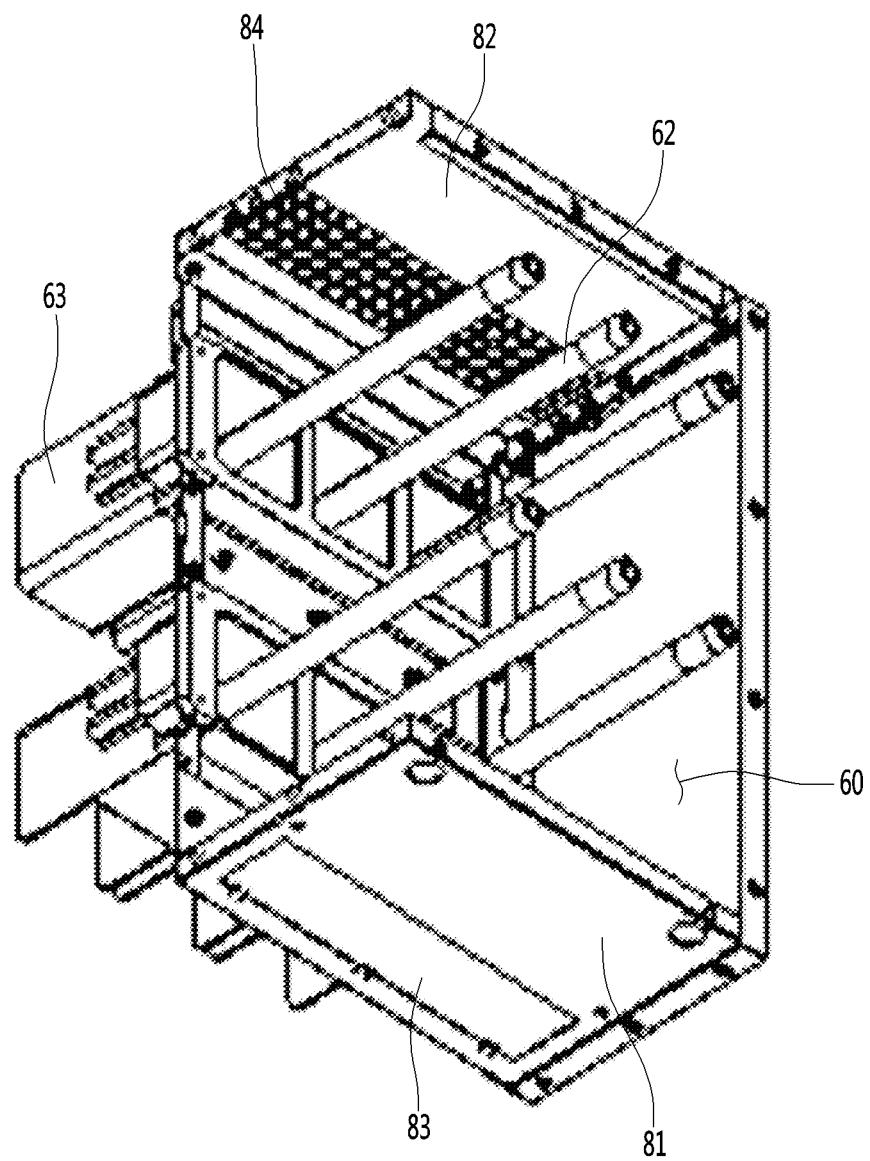
FIG. 6 is a perspective view of the current transformer compartment when viewed in a different direction.

FIG. 3 is a side view illustrating the inside of a switchgear according to an embodiment, FIG. 4 is a perspective view of the switchgear according to an embodiment, FIG. 5 is a rear perspective view of a current transformer compartment, and FIG. 6 is a perspective view of the current transformer compartment when viewed in a different direction.

A switchgear according to an embodiment may include a lower partition wall 81 which partitions a cable compartment 40 from a current transformer compartment 60 disposed above the cable compartment 40 and has an opening 87 (see FIG. 9), a relief panel 83 provided on the lower partition wall 81 to open and close the opening 87, an upper partition wall 82 which partitions the current transformer compartment 60 from a main busbar compartment 50 disposed above the current transformer compartment 60 and has at least one through-hole 84, an arc duct 70 communicating with the main busbar compartment 50, and an arc passage 80 bypassing the current transformer compartment 60 to allow the cable compartment 40 to communicate with the arc duct 70.

Hereinafter, this will be described in detail.

The switchgear according to an embodiment may include a cabinet 10 having an inner space and defining an outer appearance of the switchgear.

The cabinet 10 may include a base 11, a side body 12 disposed above the base 11 to define a side surface of the cabinet 10, a rear body 13 disposed above the base 11 to define a rear surface of the cabinet 10, and a top body disposed above the side body 12 and the rear body 13.

The side body 12 may be provided in a pair, and the pair of side bodies 12 may be respectively disposed on both left and right sides of the base 11.

Also, each of the base 11, the side body 12, the rear body 13, and the top body 14 may be constituted by an assembly of a plurality of members.

The switchgear 1 may include a relay current transformer 61, a circuit breaker, a cable, a main busbar 51 in the inner space of the cabinet 10.

The inside of the cabinet 10 may be divided into a plurality of compartments. Also, the relay current transformer 61, the circuit breaker, the cable, or the main busbar 51 may be accommodated in the compartments, respectively. The compartment in which the relay current transformer 61 is accommodated may be called a current transformer compartment 60, the compartment in which the circuit breaker is accommodated may be called a circuit breaker compartment 30, the compartment in which the cable is accommodated may be called a cable compartment 40, and the compartment in which the main busbar is accommodated may be called a main busbar compartment 50.

The current transformer compartment 60 may be disposed above the cable compartment 40 and disposed below the main busbar compartment 50. Also, the current transformer compartment 60 may be disposed at a rear side of the circuit breaker compartment 30.

A terminal bushing 63 may be disposed on a rear plate of the current transformer compartment 60, and a switchgear terminal 62 may be coupled to the terminal bushing 63. The switchgear terminal 62 may be lengthily disposed in a direction in which the switchgear terminal 62 passes through a front plate and the rear plate of the current transformer compartment 60. That is, the terminal bushing 63 may be disposed at a rear side of the current transformer compartment 60. A rear end of the switchgear terminal 62 may be disposed in the terminal bushing 63.

An outer circumference of the switchgear terminal 62 may be surrounded by a relay current transformer bushing 31. That is, the relay current transformer bushing 31 may be disposed on the outer circumference of the switchgear terminal 62. In more detail, the relay current transformer bushing 31 may include a body part 31B surrounding the switchgear terminal 62 and a head part 31A disposed on a front end of the body part 31B and coupled to the front plate of the current transformer compartment 60. The head part 31A may be disposed at a front side of the current transformer compartment 60, i.e., in the circuit breaker compartment 30. A front end of the switchgear terminal 62 may be disposed in the head part 31A.

The relay current transformer 61 may be coupled to the relay current transformer bushing 31 and disposed on an outer circumference of the relay current transformer bushing 31. The relay current transformer 61 may be disposed in the current transformer compartment 60.

A relay compartment 35 in which a relay for controlling the switchgear 1 is disposed may be provided above the circuit breaker compartment 30.

That is, the circuit breaker compartment 30 and the relay compartment 35 may be provided at a relatively front side within the cabinet 10, and the main busbar compartment 60 and the cable compartment 40 may be disposed at a relatively rear side within the cabinet 10.

A front surface of the cabinet 10 may be openable. The opened front surface of the cabinet 10 may be opened and closed by at least one front door 15.

For example, each of front surfaces of the circuit breaker compartment 30 and the relay compartment 35, which are provided at the front of the cabinet 10, may be opened, and the front door 15 may be disposed on each of the opened front surfaces.

The switchgear may include an arc duct 70. The arc duct 70 may be provided in the cabinet 10, more particularly, in the side body 12. The arc duct 70 may discharge the arc generated in the cabinet 10 and a high-pressure gas due to the arc to the outside of the cabinet 10.

The arc duct 70 may be provided in the upper portion of the cabinet 10 so that a high-temperature high-pressure gas flows upward to be smoothly discharged.

The arc duct 70 may include a front arc duct 70A and a rear arc duct 70B.

The front arc duct 70A may be disposed at a front side of the main busbar 50, disposed above the circuit breaker 30, and disposed at a rear side of the relay compartment 35. The front arc duct 70A may communicate with the relay compartment 35, the circuit breaker compartment 30, and the main busbar compartment 50.

The rear arc duct 70B may be disposed at the rear side of the main busbar compartment 50. The rear arc duct 70B may communicate with the main busbar compartment 50 and the arc passage 80.

The arc passage 80 may be disposed at a rear side of the current transformer compartment 60. The arc passage 80 may represent a space between the current transformer compartment 60 and the rear body 13.

The arc passage 80 may bypass the current transformer compartment 60 to allow the cable compartment 40 to communicate with the arc duct 70. In more detail, the arc passage 80 may bypass the current transformer compartment 60 and the main busbar compartment 50 to allow the cable compartment 40 to communicate with the arc duct 70B.

The switchgear may include a lower partition wall 81 and an upper partition wall 82.

The lower partition wall 81 may partition the cable compartment 40 from the current transformer compartment 60. The lower partition wall 81 may constitute at least a portion of a lower plate of the current transformer compartment 60.

The opening 87 (see FIG. 9) may be defined in the lower partition wall 81, and the relief panel 83 opening and closing the opening 87 may be provided on the lower partition wall 81.

The upper partition wall 82 may partition the main busbar compartment 50 from the current transformer compartment 60. The upper partition wall 82 may constitute at least a portion of an upper plate of the current transformer compartment 60. At least one through-hole 84 may be defined in the upper partition wall 82.

Due the above-described constituents, when the arc is generated in the cable compartment 40, an internal pressure of the cable compartment 40 may sharply increase due to the arc, and the relief panel 83 may be opened to open the opening 87 of the lower partition wall 81.

Thus, a portion of the high-pressure gas and the arc within the cable compartment 40 may flow to the current transformer compartment 60 through the opening 87 and pass through the through-hole 84 of the upper partition wall 82 to flow to the main busbar compartment 50 and then be discharged to at least one of the arc duct 70B and the front arc duct 70A. Also, the other portion of the high-pressure gas and the arc within the cable compartment 40 may be discharged to the rear arc duct 70B through the arc passage 80.

That is, the arc of the cable compartment 40 may be dispersed and discharged to the arc duct 70 by passing through the current transformer compartment 60 and the main busbar compartment 50 as well as the arc passage 80. Thus, the discharge of the arc to the side frame 12, and the circuit breaker compartment 30, and the rear body 13, which are structurally weak, may be prevented.

Hereinafter, the through-hole 84 of the upper partition wall 82 and the relief panel 83 of the lower partition wall 81 will be described in more detail.

Figure 7:
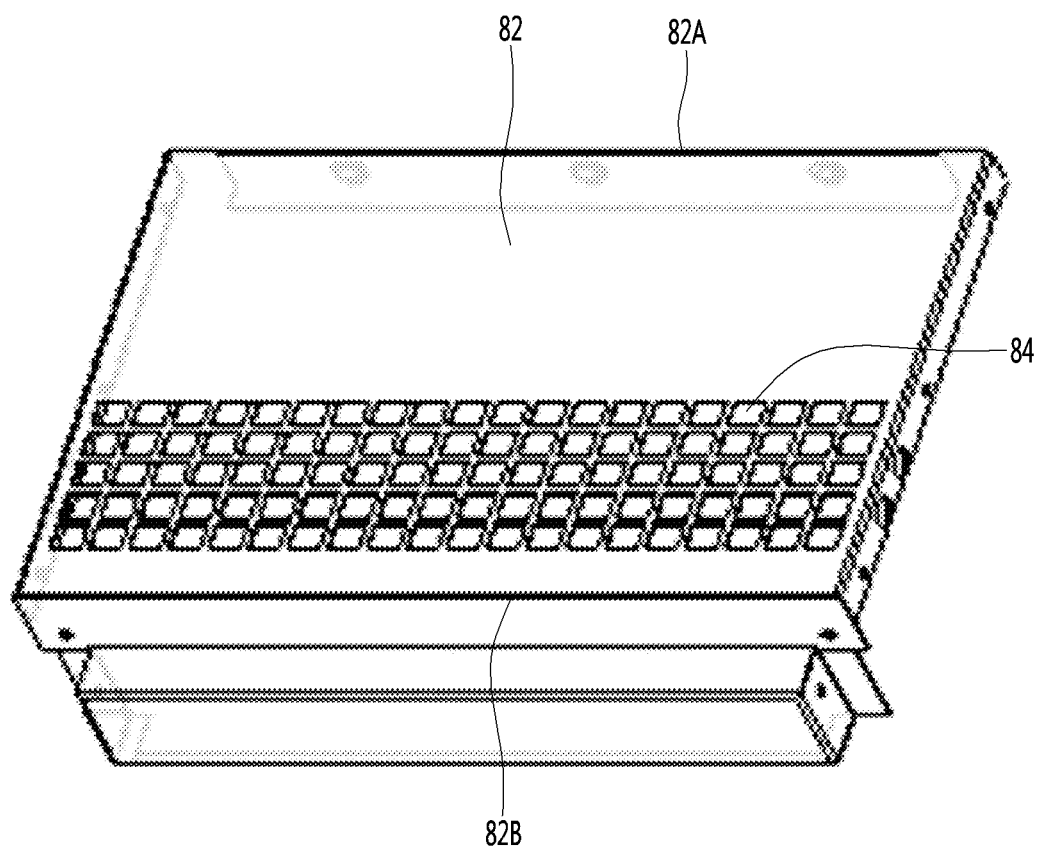
FIG. 7 is a perspective view of an upper partition wall.
Figure 8:
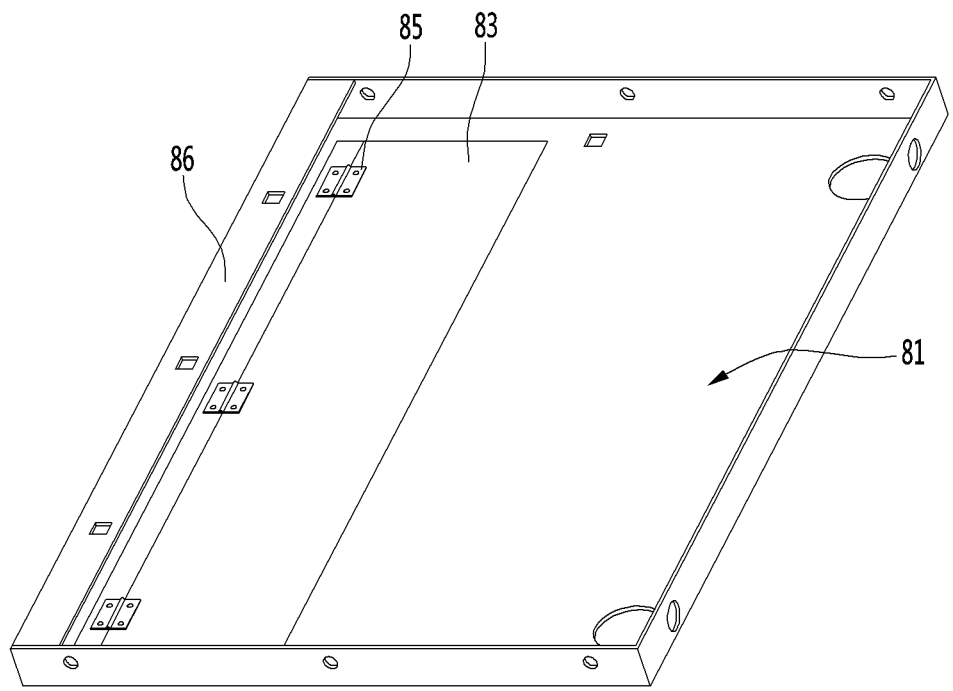
FIG. 8 is a perspective view of a lower partition wall in a state in which a relief panel is closed.
Figure 9:
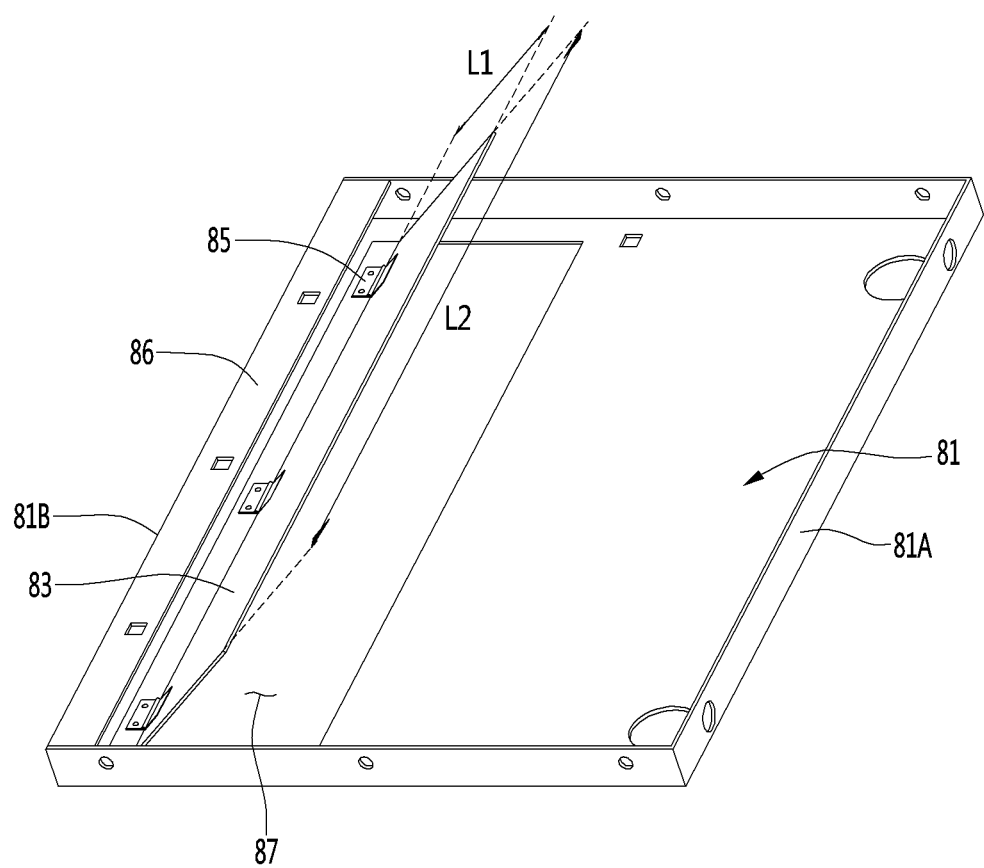
FIG. 9 is a perspective view of the lower partition wall in a state in which the relief panel is opened.

FIG. 7 is a perspective view of the upper partition wall, FIG. 8 is a perspective view of the lower partition wall in a state in which a relief panel is closed, and FIG. 9 is a perspective view of the lower partition wall in a state in which the relief panel is opened.

As described above, at least one through-hole 84 may be defined in the upper partition wall 82, and the opening 87 may be defined in the lower partition wall 81. The arc and the high-pressure gas, which are generated in the cable compartment 40, may be introduced into the current transformer compartment 60 through the opening 87 and then flow to the main busbar compartment 50 through the through-hole 84 and be discharged to the arc duct 70.

The through-hole 84 may be defined in a position that is closer to the rear edge 82B of the upper partition wall 82 than a front edge 82A of the upper partition wall 82. Each of the opening 87 and the relief panel 83 may be disposed at a position that is closer to the rear edge 81B of the lower partition wall 81 than the front edge 81A of the lower partition wall 81. As a result, an influence of the arc and the high-pressure gas, which pass through the current transformer compartment 60, to the circuit breaker compartment 30 disposed at the front side of the current transformer compartment 60 may be minimized.

Also, the through-hole 84 of the upper partition wall 82 and the relief panel and the opening 87 of the lower partition wall 81 may at least partially overlap each other in a vertical direction. Thus, a straight line distance between the opening 87 and relief panel 83 and the through-hole 84 may be minimized, and the arc and the high-pressure gas, which are introduced through the opening 87, may be quickly discharged through the through-hole 84.

The relief panel 83 may be provided to open and close the opening 87 of the lower partition wall 81. The relief panel may normally close the opening 87 to partition the cable compartment 40 from the current transformer compartment 60. When the arc is generated in the cable compartment 40, the relief panel 83 may rotate by the increasing internal pressure of the cable compartment 40 to open the opening 87.

The relief panel 83 may be connected to the connection member 85 to rotate upward from the lower partition wall 81. That is, the relief panel 83 may not rotate to a lower side of the lower partition wall 81.

The connection member 85 may rotatably connect the relief panel 83 to the lower partition wall 81. The connection member 85 may be provided as a hinge, but is not limited thereto. For example, the connection member 85 may be foldable. In this case, the connection member 85 may be made of a flexible material and also be lengthily disposed in a longitudinal direction of the relief panel 83 and have a thickness less than that of the relief panel 83.

The connection member 85 may be disposed on a top surface of the lower partition wall 81. The connection member 85 may be provided in plurality. For example, as illustrated in FIG. 9, three connection members 85 may be provided.

The connection member 85 may be connected to a front or rear edge of the relief panel 83. Hereinafter, the case in which the connection member is connected to the rear edge of the relief panel 83 will be described as an example.

The relief panel 83 may have a size equal to or greater than that of the opening 87.

For example, when the relief panel 83 has a size greater than that of the opening 87, an edge of the relief panel 83 may contact a top surface of the lower partition wall 81 to close the opening 87.

For another example, when the relief panel 83 has the same size as the opening 87, the connection member 85 connected to the relief panel 83 may be disposed on the top surface of the lower partition wall 81 to restrict a rotation radius of the relief panel 83. That is, the connection member 85 may be configured so that the relief panel 83 does not rotate to a lower side of the lower partition wall 81.

A torsion spring (not shown) may be provided on the connection member 85. Thus, when the relief panel 83 is opened, the torsion spring may apply elastic force to the relief panel 83 in a direction in which the opening 87 is closed.

Due to the above-described constituents, when the arc is generated in the cable compartment 40 below the lower partition wall 81, the relief panel 83 that closes the opening 87 may rotate upward by an increase of a pressure to open the opening 87. The arc and the high-pressure gas of the cable compartment 40 may be instantaneously introduced into the current transformer compartment 60 through the opening 87. Then, the relief panel 83 may rotate downward by the gravity to close the opening 87. Here, the relief panel 83, which rotates downward by the size of the opening 87 or the configuration of the connection member 85 may not rotate to a lower side of the opening 87.

A hook protrusion 86 for restricting the rotation radius of the relief panel 83 may be disposed on the lower partition wall 81. The hook protrusion 86 may be disposed above the lower partition wall 81. The hook protrusion 86 may be provided closer to the rear edge 81B than the front edge 81A.

The hook protrusion 86 may vertically overlap the connection member 85. In more detail, the hook protrusion 86 may vertically overlap a rotation axis of the relief panel 83. That is, a forward and backward distance from the rear edge 81A of the lower partition wall 81 to the rotation axis of the relief panel 83 may be less than that from the rear edge 81B of the lower partition wall 81 to a front edge of the hook protrusion 86.

Here, an impact prevention member (not shown) may be disposed on a front edge of the hook protrusion 86. The impact prevention member may be made of a material that is capable of easily absorbing an impact such as rubber, silicon, sponge, and the like. The impact prevention member may reduce impact force generated while the relief panel 83 and the hook protrusion 86 are bumped against each other. Thus, damage or deformation of the hook protrusion 86 or the relief panel 83 may be prevented.

Due to the above-described constituents, excessive rotation of the relief panel 83 may be prevented while the relief panel 83 rotates upward by the high pressure. The hook protrusion 86 may prevent the relief panel 83 from rotating upward at an angle of about 90 degrees or more and also solve a problem in which the relief panel 83 does not close the opening 87 again.

A left and right length L2 of the relief panel 83 may be greater than a forward and backward length L1 of the relief panel 83.

As described above, the connection member may be connected to the front or rear edge of the relief panel. That is, the rotation axis of the relief panel may be lengthily defined in a left and right direction. Thus, the relief panel 83 may have the left and right length L2 greater than the forward and backward length L1 thereof. As a result, a rotational inertia moment of the relief panel 83 may be reduced so that the relief panel 83 easily rotates.

Figure 10:
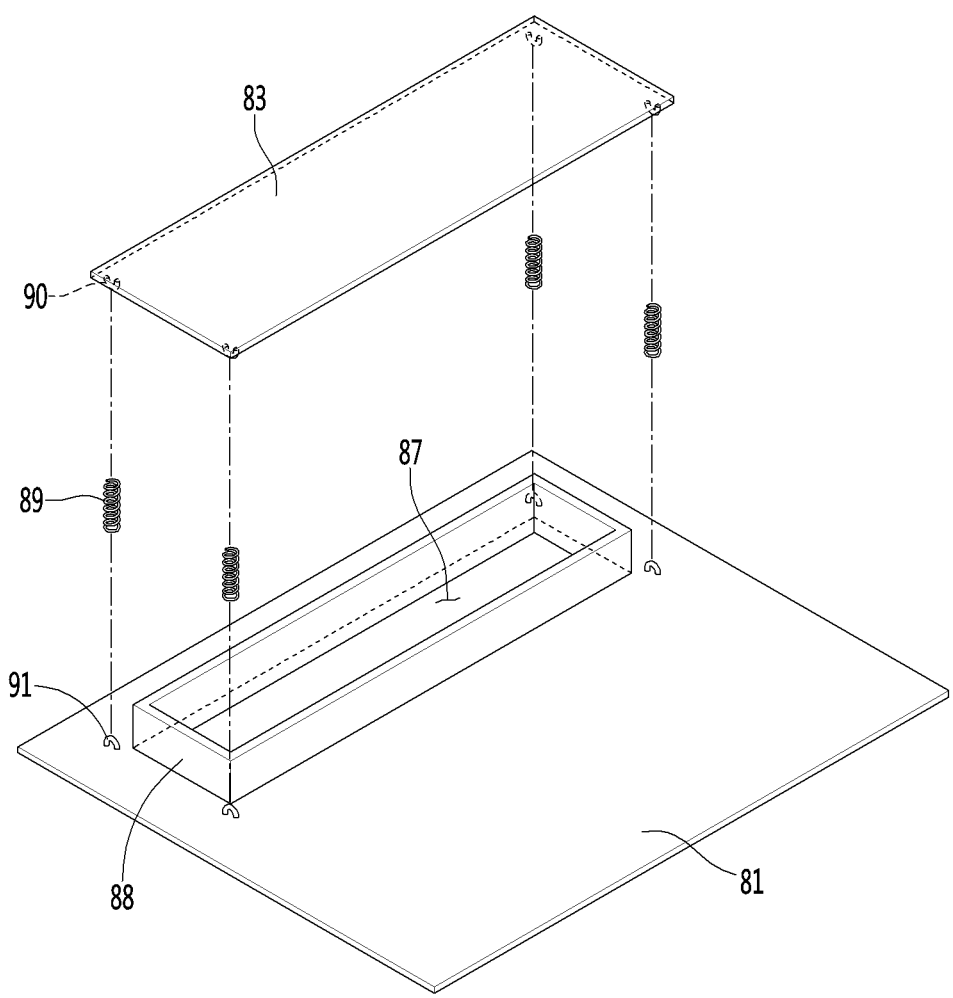
FIG. 10 is a view illustrating a connection relationship between a relief panel and a lower partition wall according to another embodiment.

FIG. 10 is a view illustrating a connection relationship between the relief panel and the lower partition wall according to another embodiment.

Hereinafter, the switchgear according to this embodiment is the same as the foregoing embodiment except for constituents related to the lower partition wall 81 and the relief panel 83, and thus, duplicated description will be omitted, and differences will be mainly described.

A switchgear according to this embodiment may further include at least one elastic member 89 connecting a lower partition wall 81 to a relief panel 83.

A hollow part 88 protruding upward from an edge of an opening 87 may be provided in the lower partition wall 81, and the relief panel 83 may be disposed above the hollow part 88.

The hollow part 88 may have an approximately rectangular hollow shape, but is not limited thereto. The inside of the hollow part 88 may communicate with the opening 87.

The relief panel 83 may contact an upper end of the hollow part 88 to cover the hollow part 88, thereby closing the opening 87.

Elastic member connection parts 90 and 91 to which the elastic member 89 is connected may be provided on the relief panel 83 and the lower partition wall 81, respectively. The elastic member connection part provided on the relief panel 83 may be called an upper connection part, and the elastic member connection part provided on the lower partition wall 81 may be called a lower connection part 91.

Each of the number of upper connection part 90 and the number of lower connection part 91 may correspond to the number of elastic member 89. For example, four elastic members 89 may be respectively provided to correspond to apexes of the relief panel 83, and also, four upper connection parts 90 and four lower connection parts 91 may also be provided.

In a state in which the relief panel 83 contacts the upper end of the hollow part 88, the elastic member 89 may have a basic length or a slightly tensioned length. Thus, the contact state between the relief panel 83 and the upper end of the hollow part 88 may be normally maintained to close the opening 87.

Due to the above-described constituents, when an arc is generated in a cable compartment 40 below a lower partition wall 81, the relief panel 83 that closes the opening 87 may move upward by an increase of a pressure and thus be spaced apart from the upper end of the hollow part 88 and open the opening 87. An arc and a high-pressure gas within the cable compartment 40 may be instantaneously introduced into a current transformer compartment 60 through the opening 87 and the hollow part 88.

Here, the relief panel 83 may move upward to allow the elastic member 89 to be tensioned and provide elastic force for pulling the relief panel 83 downward. The relief panel 83 may move downward again by the elastic force of the gravity and the elastic member 83 to contact the upper end of the hollow part 88, thereby closing the opening 87.

According to a preferred embodiment, when the arc is generated in the cable compartment, a pressure may increase to open the relief panel, and thus, the arc and the high-pressure gas may be discharged through the current transformer compartment as well as an arc passage. That is, an additional passage in addition to the existing arc passage may be provided to disperse and discharge the arc. Thus, structurally partial leakage of the arc may be prevented.

In addition, when the arc is generated, the relief panel may be automatically opened and then be automatically closed after the arc is discharged. That is, reliability of the arc discharge may be improved.

Also, the arc and the high-pressure gas, which are introduced into the main busbar compartment by passing through the current transformer compartment may flow to be branched into a rear arc duct and a front arc duct, and thus, the arc may be more quickly discharged.

In addition, an influence of the arc passing through the current transformer compartment to the circuit breaker compartment may be minimized due to the positions of the relief panel and the through-hole, and thus, the arc may be quickly discharged from the current transformer compartment.

In addition, the hook protrusion may restrict the rotation radius of the relief panel to prevent the phenomenon, in which the relief panel is not closed again, from occurring.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

What is claimed is:

1. A switchgear comprising:
    a lower partition wall partitioning a cable compartment from a current transformer compartment disposed above the cable compartment and having an opening;
    a relief panel provided on the lower partition wall to open and close the opening;
    an upper partition wall partitioning the current transformer compartment from a main busbar compartment disposed above the current transformer compartment and having at least one through-hole;
    an arc duct communicating with the main busbar compartment; and
    an arc passage bypassing the current transformer compartment to allow the cable compartment to communicate with the arc duct.

2. The switchgear according to claim 1, wherein the arc duct comprises:
    a front arc duct disposed at a front side of the main busbar compartment; and
    a rear arc duct disposed at a rear side of the main busbar compartment to communicate with the arc passage.

3. The switchgear according to claim 2, wherein the arc passage is disposed at a rear side of the current transformer compartment.

4. The switchgear according to claim 1, wherein the through-hole is defined closer to a rear edge of the upper partition wall than a front edge of the upper partition wall.

5. The switchgear according to claim 1, wherein the relief panel is disposed closer to a rear edge of the lower partition wall than a front edge of the lower partition wall.

6. The switchgear according to claim 1, wherein the through-hole and the relief panel at least partially overlap each other in a vertical direction.

7. The switchgear according to claim 1, wherein the relief panel is connected to a connection member provided on a top surface of the lower partition wall to rotate upward from the lower partition wall.

8. The switchgear according to claim 7, wherein a hook protrusion restricting a rotation radius of the relief panel is disposed on the lower partition wall.

9. The switchgear according to claim 7, wherein the connection member is connected to a front or rear edge of the relief panel, and
    the relief panel has a left and right length greater than a forward and backward length of the relief panel.

10. The switchgear according to claim 1, wherein the relief panel has a size equal to or greater than that of the opening.

11. The switchgear according to claim 1, further comprising at least one elastic member connecting the lower partition wall to the relief panel.

12. The switchgear according to claim 11, wherein a hollow part protruding upward from an edge of the opening is defined in the lower partition wall,
    the relief panel is disposed above the hollow part, and
    an elastic member connection part to which the elastic member is connected is disposed on each of the lower partition wall and the relief panel.

* * * * *